United States Patent [19]

Leonard

[11] Patent Number: 4,660,383
[45] Date of Patent: Apr. 28, 1987

[54] CLEAN AIR BLOW-BY SYSTEM FOR DIESEL ENGINE

[75] Inventor: Gary L. Leonard, Clifton Park, N.Y.

[73] Assignee: General Electric Company, Schenectady, N.Y.

[21] Appl. No.: 806,898

[22] Filed: Dec. 9, 1985

[51] Int. Cl.[4] .................. F02B 37/00; F02B 33/00; F02B 3/00
[52] U.S. Cl. .................. 60/605; 123/26; 123/193 P; 123/279; 123/303; 123/559
[58] Field of Search .................. 60/605; 123/559, 279, 123/303, 308, 26, 193 P, 533

[56] References Cited

U.S. PATENT DOCUMENTS

| | | | |
|---|---|---|---|
| 860,767 | 7/1907 | Rockwell | 123/193 P |
| 1,916,043 | 6/1933 | Enright | 123/303 |
| 2,991,766 | 7/1961 | Candelise | 123/26 |
| 2,991,767 | 7/1961 | Candelise | 123/26 |
| 3,937,188 | 2/1976 | Wrigley | 123/279 |

*Primary Examiner*—Douglas Hart
*Attorney, Agent, or Firm*—Paul R. Webb, II; James C. Davis, Jr.

[57] ABSTRACT

An improved diesel engine is provided wherein clean air is blown past compression ring seals to prevent particulate matter in combustion gases from entering between a cylinder wall or liner and a piston sidewall. The diesel engine includes at least one cylinder, a piston reciprocatingly mounted in the cylinder, a combustion air port, an exhaust gas port, a fuel injector proximate the cylinder head, and at least two compression ring seals. A clean air port communicates with the cylinder wall for conducting pressurized clean air into the cylinder. A chamber is disposed in the piston and includes a port substantially centered on the piston crown, and a blow-by port on the piston sidwall bounded by the two compression ring seals. The clean air port is spaced from the combustion air port such that when the piston is proximate the bottom-dead-center position of its stroke and combustion air is conducted into the cylinder, the compression ring seals bounding the blow-by port also bound the clean air port. Thus, during this low-compression portion of the piston stroke the pressurized clean air fills the piston chamber and is then conducted into the cylinder. when the piston is proximate its top-dead-center position during the compression and firing strokes, this clean air is compressed and blown past the compression ring seals, thereby preventing combustion products and any particulate matter situated therein from passing by the seals and abrading the cylinder liner or piston sidewall.

12 Claims, 5 Drawing Figures

CLEAN AIR BLOW-BY SYSTEM FOR DIESEL ENGINE

The present invention relates in general to diesel engines and more specifically to an improved diesel engine wherein clean air is blown past compression ring seals to prevent particulate matter in combustion gases from entering between a cylinder wall and piston sidewall.

BACKGROUND OF THE INVENTION

In operation, both two and four-stroke cycle diesel engines generate what is known in the art as "blow-by gases", or combustion gases which during the compression and firing strokes of a piston blow past compression ring seals surrounding the piston, and subsequently down between a cylinder wall and the piston sidewall. The volume of this blow-by gas is generally less than 2% of the cylinder displacement.

In diesel engines powered by fuels containing abrasive particles, for example a coal-water slurry fuel, these blow-by gases contain abrasive particulate matter (for example, ashes). When this abrasive particulate matter blows past the compression ring seals, it subsequently causes excessive wear of the piston wall, cylinder sidewall (or liner) and compression ring seals, and eventually premature failure of the diesel engine. Accordingly, it would be desirable to provide a diesel engine wherein dirty combustion gases are prevented from blowing by the compression ring seals. Such an engine would be subject to substantially less wear due to the abrasion described above, and would exhibit better reliability over an increased lifespan.

OBJECTS OF THE INVENTION

A principal object of the present invention is to provide a new and improved diesel engine wherein combustion gases are prevented from blowing by compression ring seals, and hence having increased longevity and reliability.

Another object of the present invention is to provide a diesel engine wherein only clean air is blown past the compression ring seals.

A more specific object of the present invention is to provide a diesel engine for burning slurry fuels wherein clean air is blown past the compression ring seals, thereby preventing particulate matter in the combustion gases from blowing by the compression ring seals.

SUMMARY OF THE INVENTION

A new and improved diesel engine is provided wherein clean air is blown past the compression ring seals, the pressure of the clean air preventing combustion gases from entering between a cylinder wall or liner and piston sidewall and causing abrasion therein. The invention is implemented in either a two or four-stroke cycle diesel engine including at least one cylinder, a piston reciprocatingly mounted in the cylinder, means for conducting fuel into the cylinder, and at least two means for establishing a compression seal between the piston sidewall and cylinder wall.

In accordance with the present invention, a clean air port is disposed in communication with the cylinder wall for conducting pressurized clean air into the cylinder. A chamber is disposed in the piston, including a port communicating with the piston crown and a blow-by port communicating with the piston sidewall and bounded by the two compression seal means. The clean air port is spaced from the cylinder head such that when the piston is near bottom-dead-center of the intake stroke, the two compression seal means bounding the blow-by port on the piston sidewall also bound the clean air port on the cylinder wall. Thus, pressurized clean air fills the piston chamber and is thence conducted into the cylinder. During the compression and firing strokes, this clean air is compressed and blown past the compression seal means, thereby preventing combustion products from passing by the compression seal means and entering between the piston sidewall and cylinder wall.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which like reference numerals are carried forward, and in which:

DETAILED DESCRIPTION OF THE INVENTION

Figure 1:
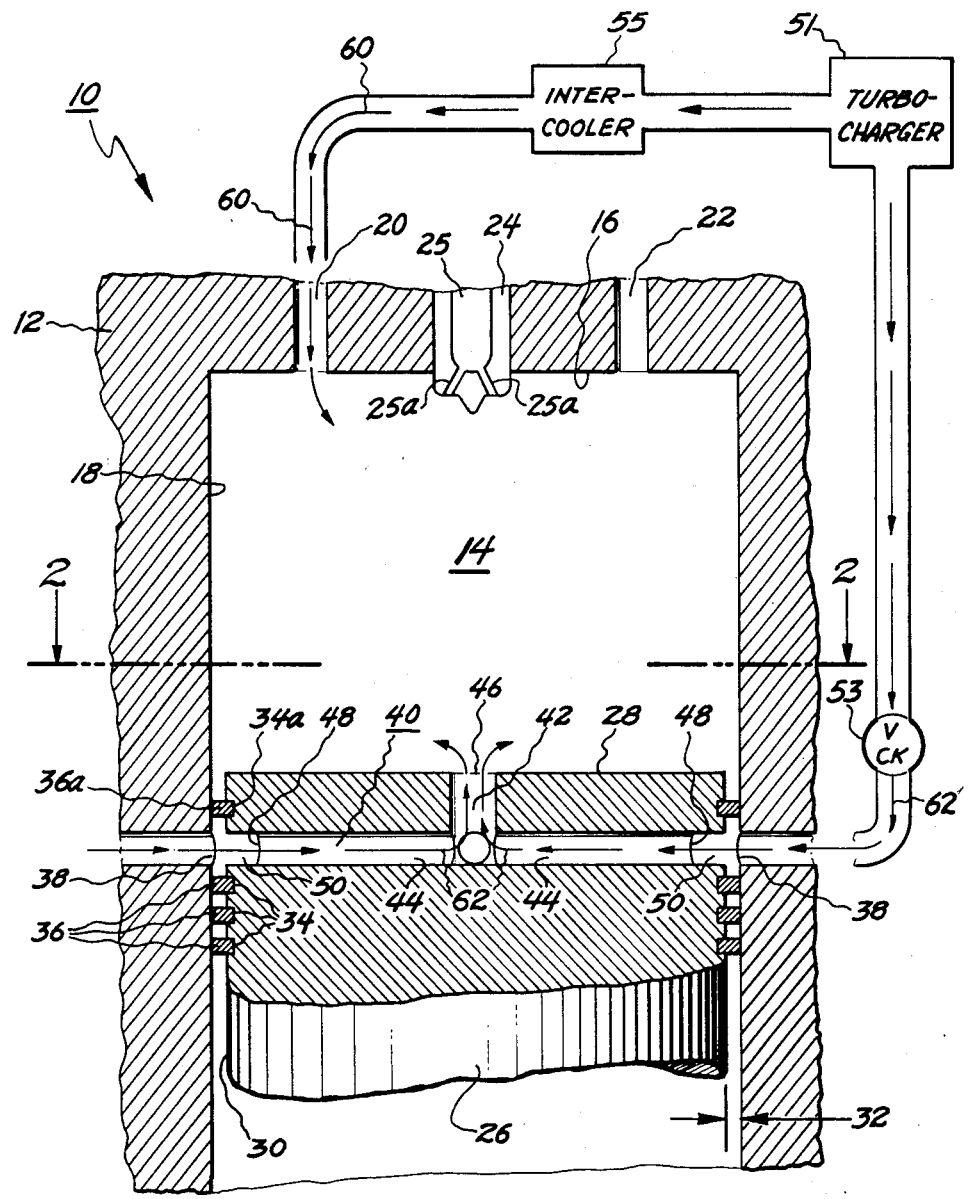
FIG. 1 illustrates a cross-sectional side view of a portion of a four-stroke cycle diesel engine constructed in accordance with the present invention.
Figure 2:
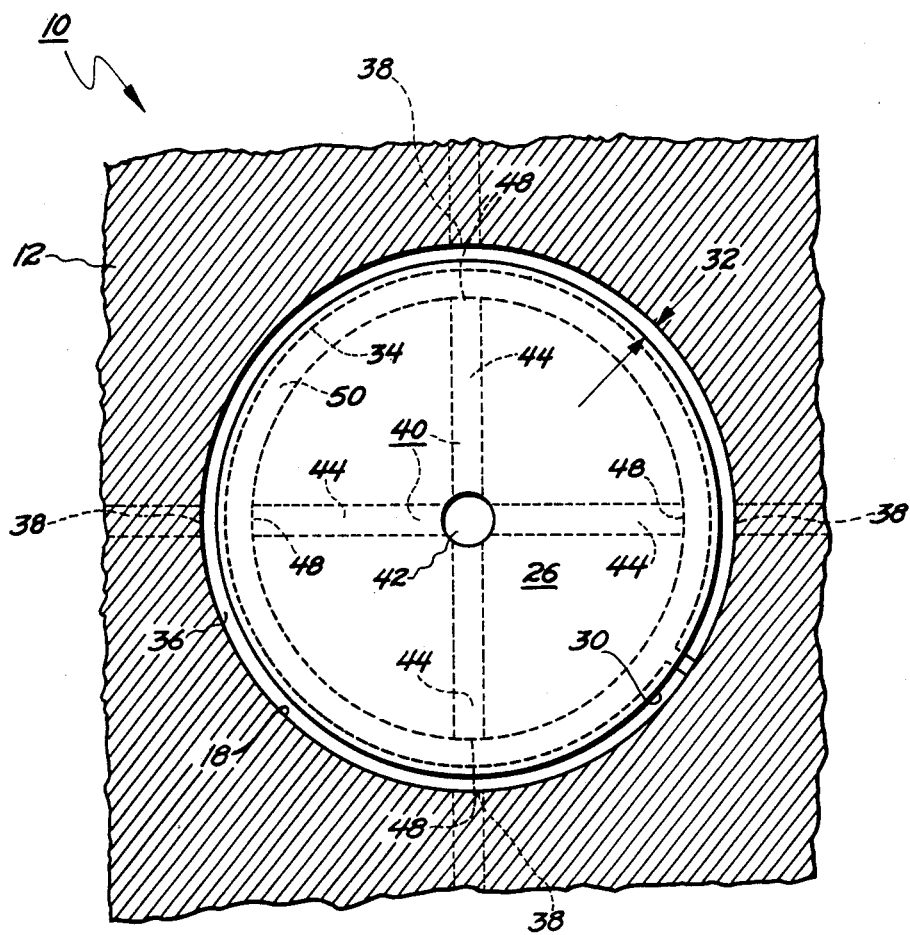
FIG. 2 illustrates a sectional view taken along line 2—2 of FIG. 1.

Referring now to FIGS. 1 and 2, a portion 10 of a diesel engine (not shown in its entirety) includes a block 12, for example comprising iron or steel, and defining a cylinder 14 including a head surface 16 and a circumferential wall surface or liner 18. Combustion air and exhaust gas ports, indicated at 20 and 22, respectively, communicate through cylinder head 16 with cylinder 14. Means for injecting fuel into cylinder 14, for example an injector as shown schematically at 24, extends through cylinder head 16 into the cylinder. Injector 24 includes a centrally disposed bore 25 terminating in two injection ports 25a for conducting fuel into cylinder 14. A piston 26 is slidingly disposed in cylinder 14 and includes a crown surface 28 adjacent cylinder head 16, and a circumferential sidewall surface 30 spaced from cylinder wall 18 by a clearance gap 32 of a predetermined distance. Piston 26 further includes three closely spaced, annular grooves, indicated at 34, each of which contains an annular, split, compression ring seal 36 preferably comprising cast-iron, for establishing a compression seal between piston sidewall 30 and cylinder wall 18. In FIG. 1, piston 26 is shown at bottom-dead-center (BDC) stroke position, whereat piston crown 28 and cylinder head 16 are at their furthest relative distance.

In accordance with the present invention, engine block 12 further defines four clean air ports 38, each communicating through cylinder wall 18 with cylinder 14. Piston 26 further defines a chamber 40 comprising an axially extending passage 42 and four radially extending passages 44. Axial passage 42 includes a port 46 centered on crown 28 of piston 26. Radial passages 44 each communicate between axial passage 42 and a respective blow-by port 48, the blow-by ports communicating through cylinder sidewall 30 with cylinder 14 via an annular channel 50. Channel 50 is of generally rectangular cross-sectional shape, is disposed on piston wall 30 and interconnects radial passages 44 at their respective blow-by ports 48. Further in accordance with the invention, piston 26 includes a fourth groove 34a containing a fourth cast-iron compression ring seal 36a, groove 34a and ring seal 36a being situated between channel 50 and cylinder crown 28 such that the upper compression ring seal 36 and ring seal 36a together bound channel 50. A turbocharger 51 is preferably connected in flow communication with clean air ports 38 via a check valve 53, and in flow communication with combustion air port 20 via an intercooler 55.

Figure 3:
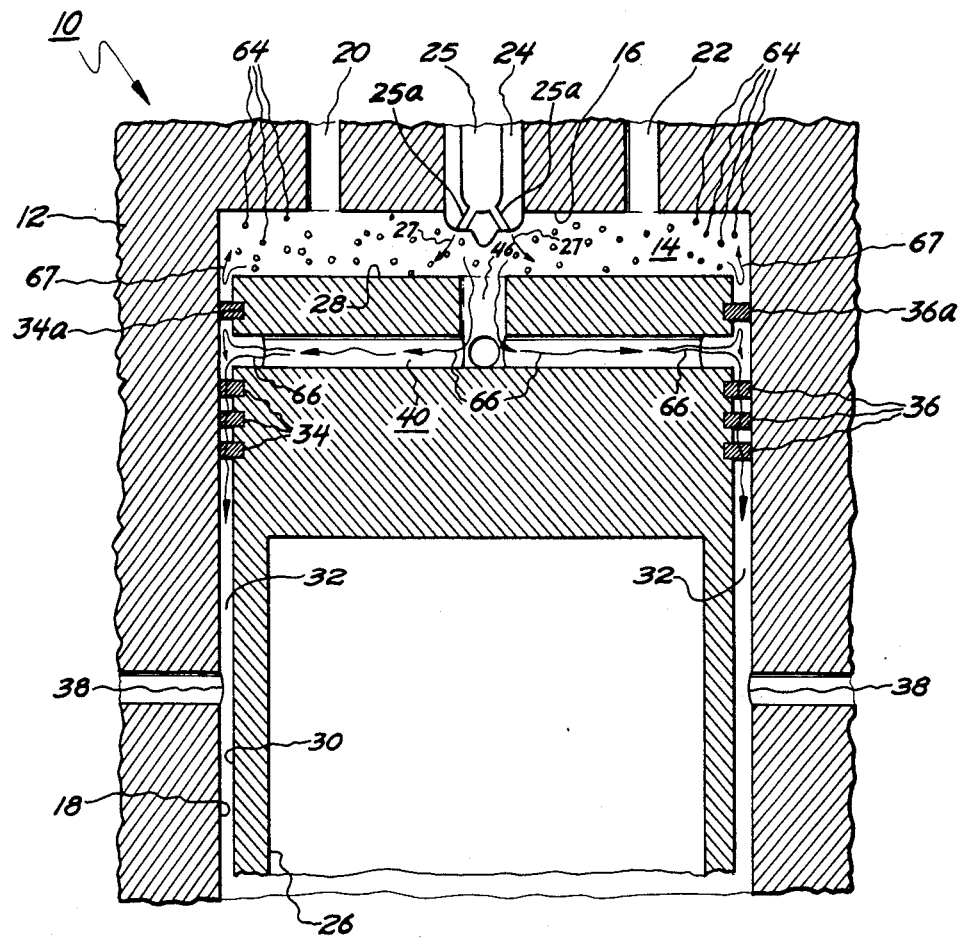
FIG. 3 is a view similar to FIG. 1 showing the piston of FIG. 1 at a top-dead-center stroke position.

FIG. 3 illustrates piston 26 at top-dead-center (TDC) of the firing stroke whereat piston crown 28 is relatively closely spaced to cylinder head 16. Fuel is indicated by fuel particles 64.

In operation, when piston 26 is near BDC (FIG. 1), combustion air generated by turbocharger 51 and cooled by intercooler 55 is conducted via combustion air port 20 into cylinder 14 along the path indicated by arrow 60. Simultaneously, clean air ports 38 are situated between, i.e. bounded by, the upper compression ring seal 36 and ring seal 36a such that pressurized clean air generated by turbocharger 51 passes through check-valve 53, fills chamber 40 and is subsequently conducted into cylinder 14 along the paths indicated by arrows 62. As illustrated and described, the source of clean air for piston chamber 40 is preferably selected to be turbocharger 51, the turbocharger normally associated with the operation of a high-power diesel engine. However, it will be appreciated by those skilled in the art that any suitable air compressor or pump may be substituted therefor. As cylinder 26 rises toward the TDC stroke position illustrated in FIG. 3, injector 24 is used to inject fuel 64 via fuel bore 25 and ports 25a in the generally diagonal direction indicated by arrows 27, into cylinder 14.

In accordance with the present invention, during the firing stroke (FIG. 3), the pressurized clean air which was conducted into chamber 40 and cylinder 14 while piston 26 was proximate BDC (FIG. 1), is forced back through chamber 40 along the paths illustrated by arrows 66 (FIG. 3) and is blown by the compression ring seals 36 and hence through gap 32. As illustrated by arrows 66 showing the path of the blow-by gases, and arrows 67 showing the path of particulate matter 64 (FIG. 3) in the vicinity of compression ring seal 36a, the pressure of this clean air substantially balances the pressure in cylinder 14 at compression ring seal 36a and prevents the particulate matter 64 in the combusted fuel from entering into gap 32 and abrading piston sidewall 30 or cylinder wall 18. The volume of chamber 40 is preferably selected to be not less than 2% of the volume of cylinder 14 as defined between piston crown 28 and cylinder head 16 when piston 26 is at TDC (FIG. 1). This volume selection will insure that substantially all of the air blown by compression ring seals 36 is clean air. As will be appreciated by those skilled in the art, pressurized clean air is blown by compression ring seals 36 during every cycle of reciprocating piston 26, thereby continuously preventing particulate matter 64 from depositing on cylinder wall 18, piston sidewall 30, or compression ring seals 36.

The position of port 46 on piston crown surface 28 is preferably selected to be at a location in cylinder 14 likely to contain the lowest concentration of fuel. This positioning of port 46 minimizes the quantity of combustion particulate matter which mixes with the clean air in piston chamber 40. Thus, in the embodiment of the invention shown and described in FIGS. 1-3 where fuel is injected substantially diagonally into chamber 14 and away from the center of crown surface 28, port 46 is centered on crown surface 28 where the concentration of fuel is likely to be lowest.

Figure 4:
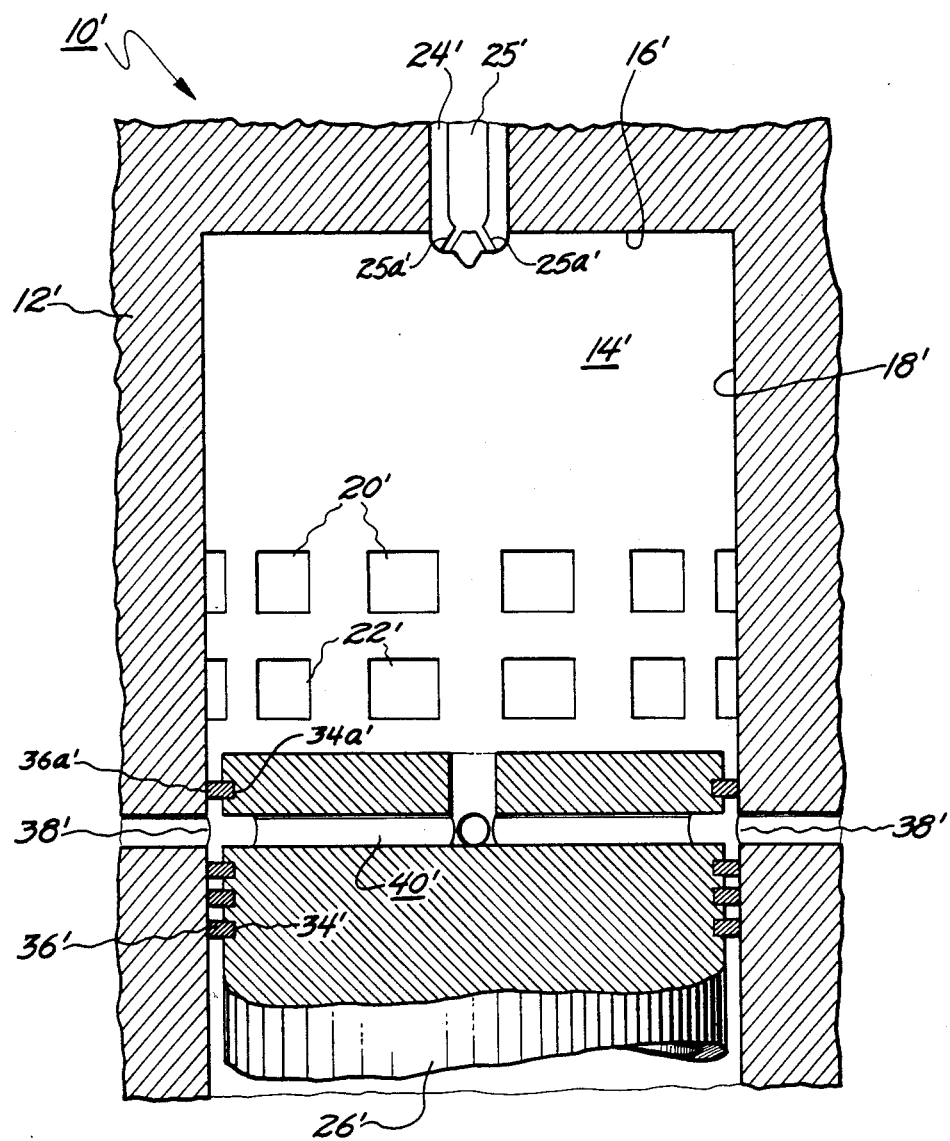
FIG. 4 illustrates a cross-sectional side view of a portion of a two-stroke cycle diesel engine constructed in accordance with the present invention.

FIG. 4 illustrates a portion 10' of a two-stroke cycle diesel engine. Features similar to those shown and described in FIGS. 1-3 are indicated by like, primed reference numerals. Diesel engine portion 10' as substantially identical to portion 10 of FIGS. 1-3, with the exception of exhaust gas and combustion air ports 20' and 22', respectively. Exhaust gas port 20' comprises a plurality of rectangular, regularly-spaced, circumferentially-disposed ports communicating with cylinder wall 18' and spaced from cylinder head 16'. Combustion air port 22' comprises a line plurality of rectangular, regularly-spaced, circumferentially-disposed ports, also communicating with cylinder wall 18', and spaced from cylinder head 16' by exhaust gas port 20'. It will be apparent to those skilled in the art that the two-stroke cycle diesel engine illustrated in FIG. 4 operates in substantially the same manner as the four-stroke cycle engine illustrated in FIGS. 1-3, with the exception of the quantity and location of the combustion air and exhaust gas ports, and the well known difference in the intake and exhaust process.

Figure 5:
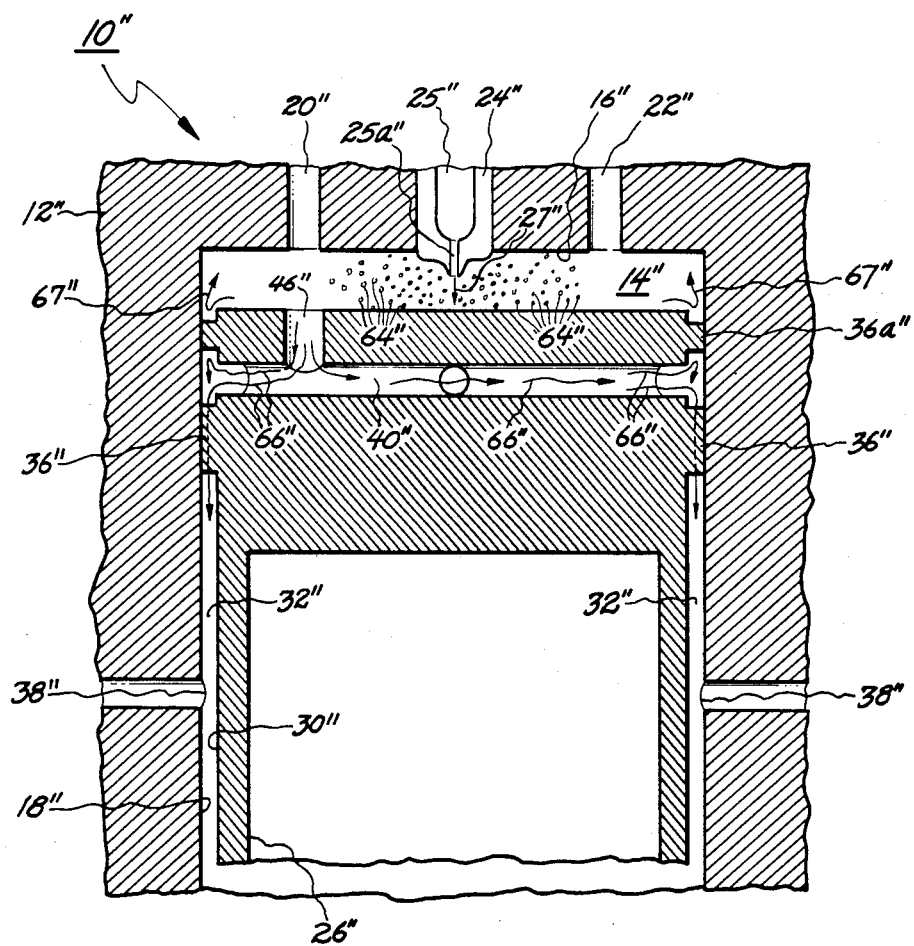
FIG. 5 illustrates a cross-sectional side view of a portion of a four-stroke cycle diesel engine constructed in accordance with an alternate embodiment of the present invention.

FIG. 5 illustrates a portion 10'' of a four-stroke cycle diesel engine in which features similar to those shown and described in FIGS. 1-3 are indicated by like, double-primed reference numerals. Diesel engine portion 10'' is substantially identical to portion 10 of FIGS. 1-3, with the exception of the construction of compression ring seals 36'' and 36a'', chamber port 46'' and injector 24''. In this alternate embodiment of the invention, injector 24'' includes a single, axially disposed fuel injection port 25a'' for injecting fuel particles 64'' substantially into the center of cylinder 14''. Accordingly, port 46'' is situated proximate piston sidewall 30'', i.e., at a location in cylinder 14'' likely to contain the lowest concentration of fuel. Further, compression ring seals 36'' and 36a'' are constructed in the form of flange extensions of piston 26''. It will be appreciated by those skilled in the art that this alternate embodiment of the invention operates substantially identically to that embodiment illustrated and described hereinabove in FIGS. 1-3.

In summary, an improved diesel engine is provided wherein clean air is blown by the piston compression ring seals during the compression and firing strokes of the engine, thereby preventing particulate matter in the combustion gases from entering between the piston sidewall and cylinder wall and causing abrasion therein.

While a preferred embodiment of the invention has been illustrated and described, it will be clear that the invention is not so limited. Numerous modifications, changes, variations, substitutions and equivalents will occur to those skilled in the art without departing from the spirit and scope of the present invention. While the invention has been shown in conventional, schematically illustrated diesel engine configurations, it has application in any diesel engine including the necessary elements for the practice thereof. Accordingly, it is intended that the invention herein be limited only by the scope of the appended claims.

What is claimed is:

1. In a diesel engine comprising a block; said block defining at least one cylinder including a head and a circumferential wall; means proximate said cylinder head for conducting fuel into said cylinder; a piston slidingly mounted in said cylinder including a crown adjacent said cylinder head and a sidewall spaced from said cylinder wall by a gap; first means surrounding said piston and spaced from said piston crown for establishing a compression seal between said piston sidewall and said cylinder wall; said piston adapted for reciprocating motion in said cylinder between a bottom-dead-center position whereat said piston crown and said cylinder head are at their furthest relative distance and a top-dead-center position whereat said piston crown and said cylinder head are at their closest relative distance; the combination of:

means for providing pressurized air;

said block further defining a clean air port communicating with said cylinder wall for conducting said pressurized air into said cylinder;

said piston defining a chamber including a first port communicating with said piston crown and at least one blow-by port communicating with said piston sidewall, said blow-by port disposed between said first means for establishing a seal and said piston crown;

second means surrounding said piston and situated between said blow-by port and said piston crown for establishing a compression seal between said piston sidewall and said cylinder wall such that said blow-by port is situated between said first and second means for establishing a seal; and said clean air port spaced from said cylinder head such that when said piston is proximate said bottom-dead-center position said first and second means for establishing a compression seal bound said clean air port for conducting said pressurized air through said blow-by port to fill said piston chamber and subsequently through said first port into said cylinder.

2. The combination according to claim 1 wherein said means for providing pressurized air comprises a turbocharger.

3. The combination of claim 1 wherein said first and second means for establishing a seal each comprises:
said piston defining an annular groove in said piston sidewall; and
a compression ring seal disposed in said groove.

4. The combination of claim 3 wherein said compression ring seal comprises a split cast-iron ring.

5. The combination of claim 1 wherein said first port is disposed on said piston crown proximate a location in said cylinder which is likely to contain a minimum concentration of combusted fuel particulate matter when said piston is proximate said top-dead-center position in preparation for and during firing.

6. The combination of claim 5 wherein said first port is disposed substantially at the center of said piston crown.

7. The combination of claim 5 wherein said block defines a plurality of said clean air ports disposed radially about said cylinder wall.

8. The combination of claim 5 wherein said piston chamber comprises:
a first passage extending axially from said first port into said piston; and
a plurality of second passages each communicating radially through said piston between a respective one of said blow-by ports and said first passage.

9. The combination of claim 8 wherein said chamber further comprises an annular channel in said piston sidewall interconnecting each of said second passages.

10. The combination of claim 1 wherein the volume of said piston chamber is selected to be not less than about 2% of the volume of said cylinder defined between said piston crown and said cylinder head when said piston is at said top-dead-center position.

11. The combination of claim 10 wherein said diesel engine comprises a two-stroke cycle diesel engine.

12. The combination of claim 10 wherein said diesel engine comprises a four-stroke cycle diesel engine.

* * * * *